US011675860B1

(12) United States Patent
Church et al.

(10) Patent No.: US 11,675,860 B1
(45) Date of Patent: Jun. 13, 2023

(54) SYSTEMS AND METHODS TO GENERATE CREATOR PAGE RECOMMENDATIONS FOR CONTENT CREATORS

(71) Applicant: Patreon, Inc., San Francisco, CA (US)

(72) Inventors: Maura Church, San Francisco, CA (US); Nikhil Purushottam Harithas, San Francisco, CA (US); John Kirsch, Berkeley, CA (US)

(73) Assignee: PATREON, INC., San Francisco, CA (US)

( * ) Notice: Subject to any disclaimer, the term of this patent is extended or adjusted under 35 U.S.C. 154(b) by 0 days.

(21) Appl. No.: 17/387,419

(22) Filed: Jul. 28, 2021

(51) Int. Cl.
*G06F 16/9535* (2019.01)
*G06Q 50/00* (2012.01)
*G06T 7/10* (2017.01)
*G06F 18/2431* (2023.01)

(52) U.S. Cl.
CPC ...... *G06F 16/9535* (2019.01); *G06F 18/2431* (2023.01); *G06Q 50/01* (2013.01); *G06T 7/10* (2017.01); *G06T 2207/20084* (2013.01)

(58) Field of Classification Search
None
See application file for complete search history.

(56) References Cited

U.S. PATENT DOCUMENTS

| 7,921,028 | B2 | 4/2011 | Cole | |
|---|---|---|---|---|
| 8,051,040 | B2 * | 11/2011 | Johnson | G06Q 30/06 707/928 |
| 8,375,024 | B2 | 2/2013 | Goeldi | |
| 8,850,490 | B1 | 9/2014 | Thomas | |
| 9,060,249 | B2 | 6/2015 | Meredith | |
| 9,558,277 | B2 * | 1/2017 | Pappas | G06F 16/9535 |

(Continued)

FOREIGN PATENT DOCUMENTS

| JP | 2019191623 A | 10/2019 |
|---|---|---|
| WO | 2009045899 A2 | 4/2009 |

OTHER PUBLICATIONS

Ondrejka, Cory, "Escaping the gilded cage: User created content and building the metaverse", 49 N.Y.L. Sch. L. Rev. 81 (2004). (Year: 2004) (23 pages).

(Continued)

*Primary Examiner* — Florian M Zeender
*Assistant Examiner* — Karma A El-Chanti
(74) *Attorney, Agent, or Firm* — Esplin & Associates, PC; Maura Church

(57) ABSTRACT

Systems and methods to generate creator page recommendations for content creators within a membership platform based on classification of content creators are described herein. Exemplary implementations may: obtain new creator information; obtain existing creator information; classify individual existing content creators into modality classes and/or genre classes based on the existing creator information; classify individual new content creators into the modality classes and/or the genre classes based on the new creator information; generate relationship information establishing relationships between the new content creators and the existing content creators; generate one or more creator page recommendations based on the relationship information; effectuate presentation of the one or more creator page recommendations; and/or perform other operations.

18 Claims, 5 Drawing Sheets

(56) References Cited

U.S. PATENT DOCUMENTS

| | | | |
|---|---|---|---|
| 9,734,521 B2 | 8/2017 | Curtis | |
| 9,767,208 B1* | 9/2017 | Chow | G06F 16/38 |
| 9,870,581 B1 | 1/2018 | Vormweg | |
| 10,356,574 B1 | 7/2019 | Wood | |
| 10,607,242 B1 | 3/2020 | Wood | |
| 10,621,532 B1 | 4/2020 | Conte | |
| 10,936,986 B2 | 3/2021 | Conte | |
| 10,937,042 B2 | 3/2021 | Wood | |
| 11,049,191 B1 | 6/2021 | Wilczek | |
| 11,270,330 B1 | 3/2022 | Brini | |
| 2002/0036654 A1 | 3/2002 | Evans | |
| 2002/0103698 A1 | 8/2002 | Cantrell | |
| 2007/0038516 A1 | 2/2007 | Apple | |
| 2007/0069013 A1 | 3/2007 | Seifert | |
| 2007/0164554 A1 | 7/2007 | Krone | |
| 2008/0120185 A1 | 5/2008 | Evans | |
| 2008/0183577 A1 | 7/2008 | Evans | |
| 2008/0215467 A1 | 9/2008 | Huffman | |
| 2008/0265020 A1 | 10/2008 | Copeland | |
| 2009/0158318 A1 | 6/2009 | Levy | |
| 2009/0234710 A1 | 9/2009 | Belgaied Hassine | |
| 2011/0258049 A1 | 10/2011 | Ramer | |
| 2011/0295722 A1 | 12/2011 | Reisman | |
| 2012/0179556 A1 | 7/2012 | Ertas | |
| 2012/0272278 A1 | 10/2012 | Bedi | |
| 2012/0278725 A1* | 11/2012 | Gordon | H04N 21/858 715/738 |
| 2012/0311462 A1* | 12/2012 | Devecka | G06Q 30/0255 715/753 |
| 2013/0197979 A1 | 8/2013 | Han | |
| 2013/0226691 A1 | 8/2013 | Chatow | |
| 2013/0275429 A1* | 10/2013 | York | G06F 16/435 707/E17.002 |
| 2014/0025473 A1 | 1/2014 | Cohen | |
| 2014/0032326 A1 | 1/2014 | Li | |
| 2014/0067554 A1 | 3/2014 | Heppding | |
| 2014/0067702 A1* | 3/2014 | Rathod | G06Q 50/01 705/319 |
| 2014/0122507 A1* | 5/2014 | Zeng | G06F 16/24575 707/749 |
| 2014/0164049 A1 | 6/2014 | Yakos | |
| 2014/0164514 A1 | 6/2014 | Eteminan | |
| 2014/0214641 A1 | 7/2014 | Acker, Jr. | |
| 2014/0280121 A1* | 9/2014 | Sharp | G06F 16/335 707/732 |
| 2014/0324604 A1 | 10/2014 | Munoz Torres | |
| 2014/0366047 A1 | 12/2014 | Thomas | |
| 2015/0066189 A1 | 3/2015 | Mulligan | |
| 2015/0066675 A1 | 3/2015 | Camelio | |
| 2015/0193889 A1* | 7/2015 | Garg | G06Q 30/0251 705/14.49 |
| 2015/0363899 A1 | 12/2015 | Krause | |
| 2016/0071058 A1* | 3/2016 | Galuten | G06Q 50/01 705/7.36 |
| 2016/0080485 A1* | 3/2016 | Hamedi | G06Q 50/01 709/204 |
| 2016/0124918 A1* | 5/2016 | Ying | G06F 16/9577 715/234 |
| 2016/0189198 A1 | 6/2016 | Mckenzie | |
| 2016/0210650 A1 | 7/2016 | Sewell | |
| 2016/0232480 A1 | 8/2016 | Erez | |
| 2016/0357376 A1 | 12/2016 | Carrigan | |
| 2017/0076348 A1 | 3/2017 | Jennings | |
| 2017/0083930 A1 | 3/2017 | Nagaraj | |
| 2017/0161794 A1 | 6/2017 | Zhu | |
| 2017/0337621 A1 | 11/2017 | Peters | |
| 2018/0040019 A1* | 2/2018 | Gavlovski | G06F 16/24578 |
| 2018/0075147 A1 | 3/2018 | Bagheri | |
| 2018/0121973 A1 | 5/2018 | Dimascio | |
| 2018/0144052 A1* | 5/2018 | Sayyadi-Harikandehei | H04N 21/25 |
| 2018/0365709 A1* | 12/2018 | Modani | G06F 16/9535 |
| 2019/0026280 A1* | 1/2019 | Aviyam | G06F 16/958 |
| 2019/0026782 A1* | 1/2019 | McGrath | G06F 16/9535 |
| 2019/0164082 A1* | 5/2019 | Wu | G06Q 50/01 |
| 2019/0290965 A1 | 9/2019 | Oren | |
| 2019/0361577 A1 | 11/2019 | Burns | |
| 2020/0007934 A1 | 1/2020 | Ortiz | |
| 2020/0020014 A1 | 1/2020 | Jin | |
| 2020/0089724 A1* | 3/2020 | Zimovnov | G06Q 30/0631 |
| 2020/0134696 A1 | 4/2020 | Lardeux | |
| 2020/0219025 A1 | 7/2020 | Conte | |
| 2020/0219114 A1 | 7/2020 | Wood | |
| 2020/0300538 A1 | 9/2020 | Avakian | |
| 2020/0311751 A1 | 10/2020 | Shi | |
| 2020/0320571 A1* | 10/2020 | Singh | G06N 20/00 |
| 2021/0133651 A1 | 5/2021 | Conte | |
| 2021/0133775 A1 | 5/2021 | Wood | |
| 2021/0158317 A1 | 5/2021 | Kurylko | |
| 2021/0192460 A1* | 6/2021 | Xu | G06Q 10/1053 |
| 2022/0277356 A1 | 9/2022 | Russo | |
| 2022/0318704 A1 | 10/2022 | Brini | |
| 2022/0377399 A1 | 11/2022 | Bonner | |

OTHER PUBLICATIONS

Mattison, David, "Reality Check for your Muses: Creativity and Business Innovation Resources", Searcher; Medford vol. 16, Iss. 10, (Nov./Dec. 2008): 16-21, 55-59. (Year: 2008).

Vanderhoef, II, Robert John, et al., "An Industry of Indies: The New Cultural Economy of Digital Game Production", University of California, Santa Barbar, Sep. 2016, pp. 1-259. (Year: 2016).

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

Gerri Detweiler, Reward Crowdfunding, Mar. 20, 2020, Nav, 11 pages, https://www.nav.com/business-financing-options reward-crowdfunding/ (Year: 2020).

Investing in Games With FIG Game Shares,Feb. 28, 2019, fig.co, 12 pages, https://www.fig.co/invest#rewards-based-crowdfunding (Year: 2019).

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/ PICMET. 2018.8481838. (Year: 2018).

Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 15-18, 2009 (Year: 2009).

Massimiliano Barbi and Marco Bigelli, Crowdfunding practices in and outside the US, Jun. 2017, 47 pages, ResearchGate DOI: 10.1016/j.ribaf.2017.05.013 (Year: 2017).

Wilson et al., Real World Applications of Machine Learning Techniques over Large Mobile Subscriber Datasets, SE4ML: Software Engineering for Machine Learning , 9 pages, Arxiv ID: 1502.02215 Publication Date: Feb. 8, 2015 (Year: 2015).

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

Content and conduit: Relative profitability in the new era of television Todreas, Timothy Michael. ProQuest Dissertations and Theses, ProQuest Dissertations Publishing. (1996) (Year: 1996) 431 pages.

Harris, William. "26 Inexpensive Customer Delight Ideas Worth Trying to Fuel Business Growth" Sellbrite, Jun. 2016, https://ww.sellbrite.com/blog/customer-delight/(Year: 2016).

Hyken, Shep. "Seven Ways to Properly Give a Gift to Your Customers" Shep Hyken's Blog, Jun. 2016, https://hyken.com/internal-customers/seven-ways-properly-give-gift-customers/ (Year: 2016).

Miller, Nicole. "Inside Buffer's Community Delight Headquarters: How and Why We Send Swag and What It All Costs" Buffer, Apr. 27, 2015, https://buffer.com/resources/community-delight/ (Year: 2015).

(56) References Cited

OTHER PUBLICATIONS

Shipwire. "Marketing inserts" Shipwire support, Feb. 27, 2015, https://www.shipwire com/w/support/marketing-inserts/ (Year: 2015).
Yarbro, Printify Vs. Printful: Pros and Cons, Dec. 9, 2019, nomadicwander, https://nomadicwander.com/2019/12/09. printify-vs-printful-pros-and-cons/ (Year:2019).
Author(s):Osuala Title: Impact of subscription based crowdfunding on creators online channels Journal: ERF [online]. Publication date: 2019.[retrieved on: Feb. 23, 2023 ]. Retrieved from the Internet: < URL: https://aisel.aisnet.org/cgi/viewcontent.cgi?article=1017& context=amcis2019> (Year: 2019).

\* cited by examiner

US 11,675,860 B1

SYSTEMS AND METHODS TO GENERATE CREATOR PAGE RECOMMENDATIONS FOR CONTENT CREATORS

FIELD

The disclosure relates to systems and methods to generate creator page recommendations for content creators within a membership platform based on classification of content creators.

BACKGROUND

Different platforms may be utilized by entities seeking contributions from the general public to obtain a needed or desired service(s) and/or resource(s). Some of these platforms facilitate raising resources (i.e., funds) from the users through monetary contributions or donations to support a project. Oftentimes, supporters of a project are given rewards or special perks, where the size and/or exclusivity of the rewards or special perks may depend on the amount contributed.

SUMMARY

A membership platform may be comprised of users including one or more of content creators, subscribers, and/or other users. Content creators may be users of the membership platform who offer content (also referred to as "benefit items") to subscribers in exchange for consideration. A "benefit item" may refer to a good and/or service. A good may comprise a physical good and/or a digital good (e.g., "online" content). In some implementations, subscribers may donate funds to a content creator such that the benefit item may be the altruism in supporting the content creator. Subscribers may be users of the membership platform who subscribe, through payment of a one-time and/or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, different frequency of content provision, different (or additional) content altogether, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

The present disclosure addresses one or more problems in building creator pages for new content creators. Creator pages help creators define themselves and/or their content, and may dictated the success and/or growth of content creators since subscribers may view these creator pages to decide whether to subscribe to a content creator. New content creators (e.g., users who are newly onboarded to the membership platform) may have difficulty building creator pages. It may be beneficial to provide creator page recommendations based on the pages of more experienced content creators. Traditionally, recommendations may come from analyzing creator pages belonging to successful content creators that are "related" to the new content creators. The relatedness may derive from classifying the content creators into categories, typically by the "type" of content they create. However, some traditional approaches to classifying content creators may be too broad and may not always result in creator page recommendations that are applicable to new content creators. A "type" of content may include content with a wide range of varying interests, subjects, and/or categories. For example, audio content may include one or more of ASMR (autonomous sensory meridian response) content, podcast content, music content, and/or other audio content. Using in the classifier of "type" to find "related" content creators may be too broad (e.g., ASMR content, podcast content, and music content would be grouped into the same "audio content" class) and result in creator page recommendations that do not benefit the new content creators. Accordingly, there is a need to determine, in a computationally efficient manner, creator page recommendations within a membership platform using more granular classifications of benefit items offered by content creators.

One aspect of the present disclosure relates to a system configured to generate creator page recommendations for content creators within a membership platform based on classification of content creators. It is noted that the term "classification of content creators" may refer to the classification of the benefit items the content creators create. As a basic summary, the system may obtain new creator information relating to new content creators and/or benefit items offered by the new content creators. The system may obtain existing creator information relating to existing content creators and/or benefit items offered by the existing content creators. In some implementations, existing content creators may include content creators that have already set up a user account and/or created a creator page. In some implementations, existing content creators may include content creators that have a user account and/or a creator page that has been present in the membership platform for a threshold period of time. In some implementations, the threshold period of time may include at least one day. In some implementations, existing content creators may include content creators that have a threshold number of subscribers. In some implementations, existing content creators may include content creators that have at least one subscriber.

The system may classify the new content creators and the existing content creators into one or more of a modality class, a genre class, and/or other classes. The system may establish relationships between the new content creators and the existing content creators based on commonality in the one or more classes. These steps may facilitate the generation, based on the established relationships, creator page recommendations for the new content creators based on the creator pages of existing content creators that are determined to be related and/or similar.

The system may include one or more hardware processors configured by machine-readable instructions and/or other components. The machine-readable instructions may include one or more computer program components. The computer program components may include one or more of an information component, a classification component, a recommendation component, a presentation component, and/or other computer program components.

The information component may be configured to obtain new creator information for new content creators of a membership platform. A "new" content creator may comprise a user who has recently created a creator account with the membership platform and/or may undertaking an onboarding procedure to become a content creator within the context of the membership platform. The new content creators may offer benefit items to subscribers of the membership platform who subscribe to the content creators in exchange for consideration. The new creator information may characterize the benefit items to be offered. By way of non-limiting illustration, the new creator information may characterize a first set of benefit items to be offered by a first new content creator.

The information component may be configured to obtain existing creator information for existing content creators of the membership platform. The existing creator information may characterize the benefit items offered by the existing content creators. By way of non-limiting illustration, the existing creator information may characterize a first set of benefit items offered by a first existing content creator, and a second set of benefit items offered by a second existing content creator.

The classification component may be configured to classify individual existing content creators into one or more of a modality class, a genre class, and/or other classes based on the existing creator information and/or other information. An individual modality class may characterize a mode in which the benefit items offered by the individual existing content creators are experienced and/or are expressed. An individual genre class may characterize a theme or topic of the benefit items offered by the individual existing content creators and/or other information. By way of non-limiting illustration, the first existing content creator may be classified into a first modality class and a first genre class, and the second existing content creator may be classified into a second modality class and a second genre class.

The classification component may be configured to classify individual new content creators into one or more of a modality class, a genre class, and/or other classes based on the new creator information and/or other information. By way of non-limiting illustration, the first new content creator may be classified into the first modality class and the first genre class.

The recommendation component may be configured to generate relationship information establishing relationships between individual new content creators and one or more of the existing content creators based on commonality within one or more of the modality classes, the genre classes, and/or other classes. By way of non-limiting illustration, the relationship information may establish a first relationship between the first new content creator and the first existing content creator based on the commonality within one or more of the first modality class, the first genre class, and/or other classes.

The recommendation component may be configured to generate one or more creator page recommendations based on the relationship information and/or other information. An individual creator page recommendation may include a recommendation as to content and/or form of an individual creator page of an individual new content creator. The individual creator page recommendation may include recommendations based on the content and/or form of individual creator pages of one or more existing content creators that are related. By way of non-limiting illustration, a first creator page recommendation may be generated based on the relationship information. The first creator page recommendation may include a recommendation as to the content and/or form of a first creator page for the first new content creator based on the content and/or form of a second creator page for the first existing content creator and/or other content creators.

The presentation component may be configured to effectuate presentation of the one or more creator page recommendations on one or more computing platforms of one or more of the new content creators. By way of non-limiting illustration, the first creator page recommendation may be presented on a first computing platform of the first new content creator.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership platforms that allow consumers to sign up for ongoing payments in exchange for rewards and/or other membership benefits.

Entities seeking funding may be content creators, for example, artists, musicians, educators, speakers, etc. Content creators may create content, which may refer to one or more of information, experiences, products, and/or other content provided to an audience or end-user, whether it be digital, analog, virtual, and/or other form. For example, content may include but is not limited to online content such as video content, podcasts, photographic art, webcomics, do-it-yourself crafts, digital music, game content, performance art, and/or other content. Content creators may utilize membership platforms that allow consumers to become subscribers of the content creator. As subscribers, consumers may contribute or donate money to a content creator on a recurring (e.g., weekly, monthly, annually, etc.) basis and/or per piece of content created by the content creator. Content creators may interact with subscribers and/or prospective subscribers (e.g., consumers that show interest in the content created by content creators) in a variety of ways. The subscribers may be presented recommendations for new content creators they may be interested in. This allows the content creators to reach a broader audience, as well as allow subscribers to expand their access to content.

Figure 1:
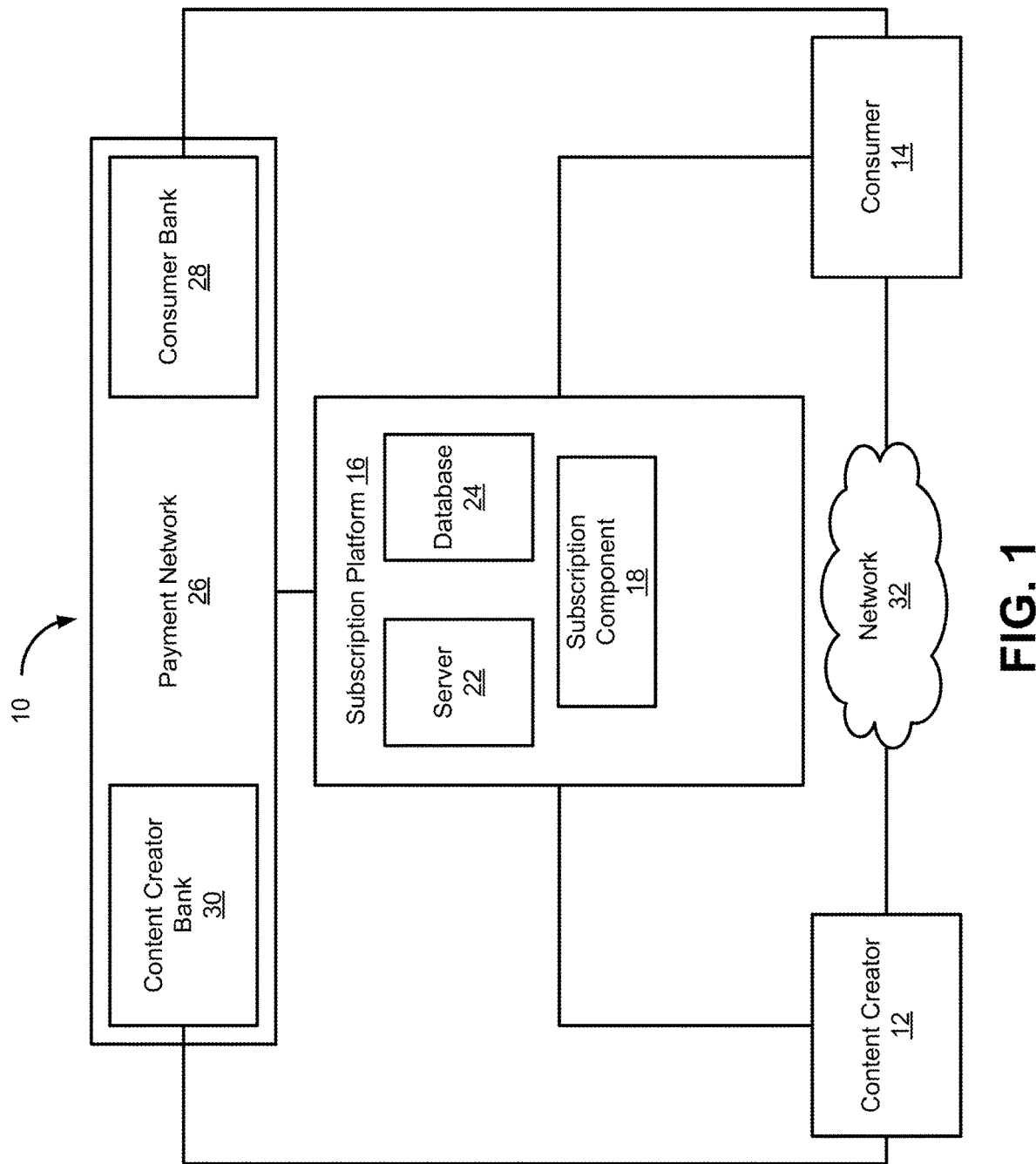
FIG. 1 illustrates an example membership system.

FIG. 1 illustrates an example subscriber-based membership system 10 (also referred to herein as a "membership platform"). A content creator 12 may register and set up a creator account with subscription platform 16. The registering and setting up a creator account with subscription platform 16 may be part of an onboarding process. Content creator 12 may create a creator page (also referred to as simply a "page") on a website and/or application hosted by server 22 of subscription platform 16 and input relevant information. Content creator 12 may input information associated with and/or relevant to content creator 12 via subscription component 18, such as creation information, content information, subscription level information specifying desired and/or initial subscription levels, preferred revenue source information (e.g., preferred currency, currency source, and/or other information), and/or other information. A page created by content creator 12 may be built using such information to make potential consumers aware of how content creator 12 may wish to be supported/receive support for his/her content creation in addition to subscribership revenue. Content creator 12 may set up the content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber" or "patron") may set up a subscriber account with subscription platform 16. In setting up the subscriber account, consumer 14 may input subscriber information and/or other information. The subscriber information may also be obtained as a user continues to interact with the membership platform. By way of non-limiting illustration, subscriber information my include one or more of demographic information relevant to consumer 14 (e.g., age, income, job, etc.), information identifying the consumer, preference information, search information, subscribership information, and/or other information. The information identifying consumer 14 (e.g., name, a picture, a phone number, etc.) may be input by consumer 14 when setting up the subscriber account. The preference information may include their preferences (e.g., likes and dislikes). The preferences may be specified with respect to content class and/or other specifications. The preference information may be obtained as consumer 14 interacts with membership platform, e.g., by submitting upvotes (representing likes) and/or downvotes (representing dislikes). The search information may include search queries the subscribers have input when searching for new creators/content via the membership platform.

In some implementations, the subscribership information of the subscribers may characterize the subscribership of the individual subscribers to individual content creators. The subscribership information may include one or more of identification of individual content creators the individual subscriber subscribes to, length of subscribership to individual content creators, date of initial subscribership to individual content creators, a subscription level, lifetime contribution amount paid to individual content creators, subscriber-initiated interactions, and/or other information. The subscriber-initiated interactions may be characterized based on one or more of content of the interactions, form of the interactions, point in time of the interactions, and/or other information. The content of the interactions may include what was communicated. The form of interactions may indicate how the communication was made. By way of non-limiting illustration, communication may be made by one or more of chat, comments, posting of forum or message board, phone call, video chat, and/or other forms of communication.

Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. It is noted that although the term "bank" is used, these components may comprise one or more of banking information, credit and/or debit card information, accounts through which payments can be made, and/or other entities beyond a traditional "bank." Instead, the term "bank" may be used to refer to a source from which payment amounts may be drawn and/or deposited.

In some implementations, consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of benefit items including online content, physical content, and/or other content. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., Wi-Fi), a mobile communication network, a satellite network, the Internet, fiber optic, coaxial cable, infrared, radio frequency (RF) or any other suitable network. The preferential access may be provided to consumer 14 from content creator 12 via subscription platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify their desired subscription levels and corresponding preferential access, as well as their preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may be associated creator information characterizing the content creator 12 and/or the benefit items created by content creator 12, and/or other information. The creator information may include one or more of subscribership information, content information, creator profile information, creation information, page information, performance information, and/or other information. The content creator 12 may be able to change (e.g., add, delete, update, modify, etc.) such information. Such changes may be input via subscription component 18 and reflected in its local memory and/or database 24. It should be understood that content creator 12 and/or consumer 14 may be an individual or some entity representative of an individual or group of individuals.

Page information may include content associated with a creator page created by content creator 12. The page information may include one or more of text appearing on the creator page, images appearing on the creator page, videos on the creator page, and/or other content. For example, creator pages may include text descriptions of the benefit items offered, background information of the content creator, text descriptions of the benefit items offered at each level of preference access, and/or other information. Background information of the content creator may include the content creator's local, age, interests, and/or other information.

In some implementations, the page information may include image classification information defining image classes of images and/or other content included in the individual creator pages of the individual content creators. Images included on the individual creator pages may provide information related to the benefit items and/or to the content creators. The image classification information may be based on image features and/or other information. Image features may include content, subject matter, topic, style (i.e., photography, computer-generated imagery, etc.), and/or other aspects of individual images. In some implementations, image features may be obtained using feature extraction methods including one or more of pattern recognition, image processing, machine learning, computer vision, scale-invariant feature transform (SIFT), speeded up robust features (SURF), and/or other methods. By way of non-limiting illustration, image classes may include one or more animal image classes, human image classes, landscape image classes, computer-generated image classes, text image classes, and/or other image classes for other image features.

Content information may characterize benefit items that content creator 12 creates. The content information may include information defining and/or describing one or more of the benefit items offered by the content creator 12, the amount of benefit items created, frequency at which the benefit items are created, modality in which the benefit items are experience and/or expressed, genre of the benefit items and/or content creators, other classifications of the benefit items, and/or other information. In some implementations, modality, genre, and/or other classifications may be determined through one or more features and/or functionality presented herein. In some implementations, modality, genre, and/or other classifications may be specified by the content creators.

The modality class may characterize a mode in which the benefit items offered by the individual content creators are experienced and/or are expressed. The mode in which benefit items are experienced and/or expressed may refer to form and/or format of the content and/or how the content is experienced and/or expressed. The content may be experienced and/or expressed visually, audibly, physically, digitally, and/or other considerations.

In some implementations, how the content is experienced may refer to how subscribers consume the benefit items. How subscribers consume the benefit items may include actions they carry out in light of and/or in response to the benefit items. How subscribers consume the benefit items may be defined by physiological reactions, viewer interaction (e.g., playing a video game, passive observation), viewer experience (e.g., virtual reality, augmented reality), and/or other information. The consumption may be active and/or passive actions. By way of non-limiting illustration, a subscriber may experience game content through active consumption (e.g., they play the game). By way of non-limiting illustration, a subscriber may experience a podcast through passive consumption (e.g., they listen). By way of non-limiting illustration, a subscriber may experience a physical art through active and/or passive consumption (e.g., they can physically hold the art, hang the art on a wall, view the art, etc.). By way of non-limiting illustration, a subscriber may experience an instructional do-it-yourself video through active and/or passive consumption (e.g., they may view the video while actively performing the do-it-yourself instructions on their own).

In some implementations, how content is expressed may refer to the form and/or format of how the benefit items are produced. How the benefit items are produced may refer to the steps and/or actions a content creator goes through to produce the content. By way of non-limiting illustration, benefit items may be produced one or more of in an audible format, visual format, digital format, physical format, and/or other means of production. The steps and/or actions a content creator goes through to produce the content may be content dependent. By way of non-limiting illustration, ASMR content may be produced by recording audio with highly sensitive microphones, with soft spoken speech, and/or other steps. By way of non-limiting illustration, physical artwork may be produced by applying paint to a canvas. By way of non-limiting illustration, a podcast may be produced by recording (or streaming live) multiple people, each being individually mic'd, having a conversation, addressing the listening audience (or not), and/or other steps.

By way of non-limiting illustration, autonomous sensory meridian response (ASMR) content may include soft or quiet audio tones that elicit certain tingling sensations for the viewer that are not associated with other kinds of audio digital content, such as podcasts including conversational audio tones. ASMR content may be placed in a different modality class than podcasts based on the viewer's elicited physiological response and/or other information. In some implementations, the mode in which the benefit items are experienced or are expressed may be characterized by how the benefit items are produced and how the benefit items are consumed.

In some implementations, the modality classes may include one or more of an ASMR class, a game modification class, a music class, a photography class, a podcast class, a video class, a visual arts class, a writing class, and/or other classes.

Genre may describe a theme and/or a topic of the content. Genre may be characterized by similarities in form, style, and/or subject matter. Genre may be characterized independent of modality. Genre may be characterized with respect to individual modalities. By way of non-limiting illustration, content of varying modality may be of the same genre class. Content of the same modality may have various genres. By way of non-limiting illustration, ASMR content may be a food genre (sounds of a person eating); and/or ASMR content may be a story telling genre. By way of non-limiting illustration, podcast content may be WWII genre.

The "amount" of content produce may reflect that content creator 12 created a series of artwork comprising four paintings. Content frequency information may indicate that content creator 12 develops three video games over the course of six months. Such information may be stored in content database 24. By way of non-limiting illustration, content information for a given content creator 12 may indicate that the content creator 12 creates landscape paintings on canvas once a week. By way of non-limiting illustration, content information for a given content creator 12 may indicate that the content creator 12 creates comic-themed graphic art every day. By way of non-limiting illustration, content information for a given content creator 12 may indicate that the content creator 12 develops war-themed video games for a mobile platform quarterly. By way of non-limiting illustration, content information for a given content creator 12 may indicate that the content creator 12 performs in online musical performances on a monthly basis.

In some implementations, the subscribership information of the content creators may characterize the subscribership of the individual content creators. The subscribership information of the content creators may include one or more of identifying information of the subscribers to the individual content creators, length of subscribership of the individual subscribers to the individual content creators, date of initial subscribership of the individual subscribers to the individual content creators, a subscription level of the individual subscribers, subscriber rank among other subscribers to individual content creators, lifetime contribution amount by the individual subscribers, subscriber-initiated interactions, and/or other information. The identifying information of the individual subscribers may include one or more of name, username, demographics, email, and/or other information identifying an individual subscriber.

The performance information may describe acceptance of offers for the benefit items by the subscribers to a content creator. The acceptance of the offers for the benefit items by the subscribers may be described based on one or more of quantity of subscribers who have accepted the offers (e.g., including one or more of a total, an average, a frequency, a quantity over a certain time period, etc.), an amount of revenue received from subscribers who have accepted the offers (e.g., including one or more of a total, an average, a frequency, a quantity over a certain time period, etc.), subscriber retention (e.g., churn), and/or other information.

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
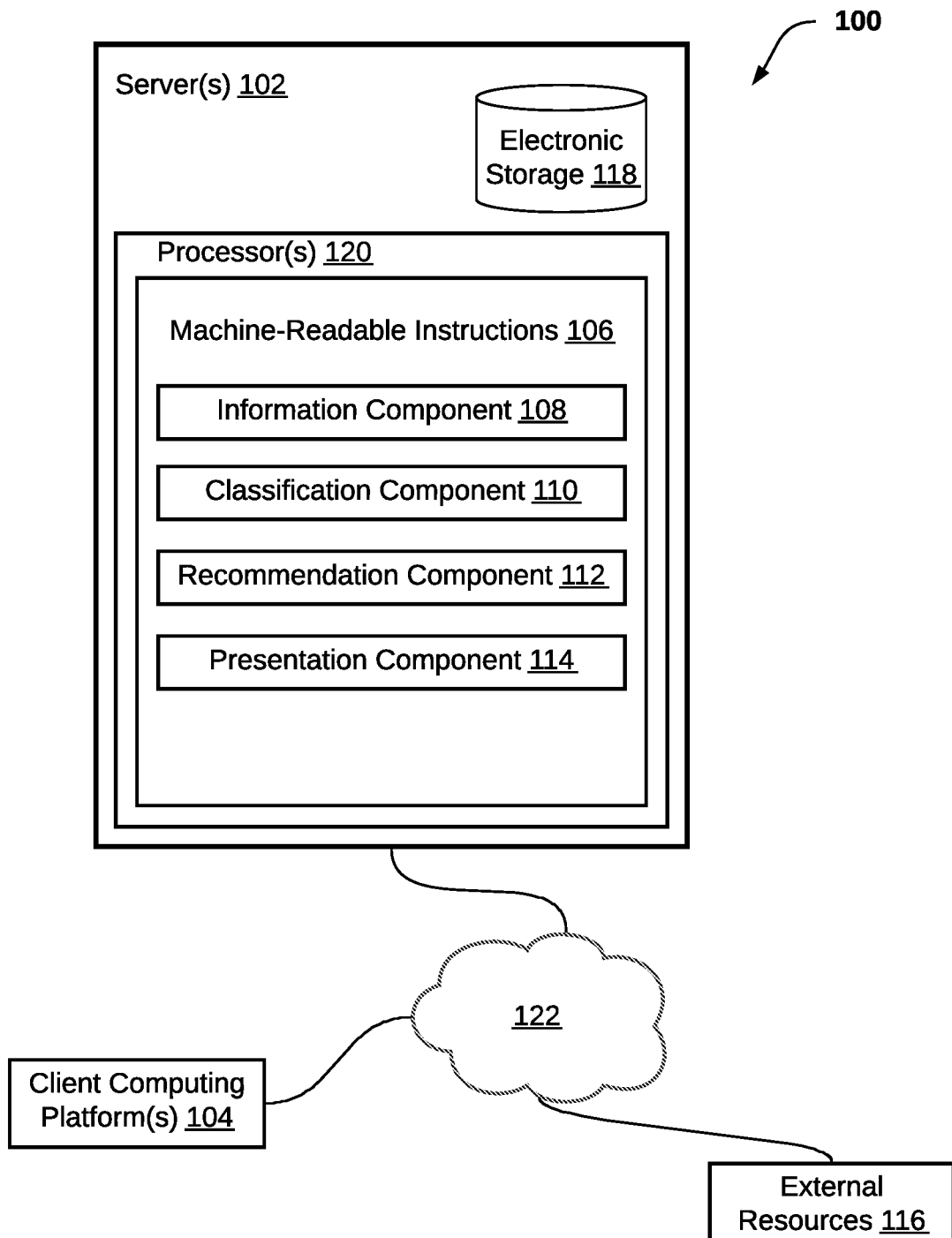
FIG. 2 illustrates a system configured to generate creator page recommendations for content creators within a membership platform, in accordance with one or more implementations.

FIG. 2 illustrates a system 100 configured to generate creator page recommendations for content creators within a membership platform based on classification of content creators. In some implementations, system 100 may include one or more of server(s) 102, client computing platform(s) 104, and/or other components. The terms "remote" computing platform, "client" computing platform, and/or "computing platform" may be used interchangeably herein to refer to individual ones of the client computing platform(s) 104. Server(s) 102 may be configured to communicate with one or more client computing platforms 104 according to a client/server architecture and/or other architectures via one or more network(s) 122. In some implementations, one or more network(s) 122 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

It is noted the system 100 of FIG. 2 may be the same as, or included as part of, the system 10 shown in FIG. 1. For example, the server(s) 102 may be the same as or included in server 22. Network(s) 122 may be the same as or included in network 32. Individual client computing platforms of one or more client computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. The computer program components may include one or more of an information component 108, a classification component 110, a recommendation component 112, a presentation component 114, and/or other computer program components.

Information component 108 may be configured to obtain new creator information for new content creators of a membership platform and/or other information. The new content creators may offer benefit items to subscribers of the membership platform who subscribe to the content creators in exchange for consideration. The new creator information may characterize the benefit items to be offered by the new content creators. By way of non-limiting illustration, the new creator information may characterize a first set of benefit items to be offered by a first new content creator, and/or other benefit items to be offered by one or more other new content creators.

In some implementations, the new creator information may include user-specification of one or more of a modality class, a genre class, and/or other classes based on user input by the new content creators. The user input may be obtained through the user completing one or more quizzes, surveys, forms and/or through other methods of obtaining information. In some implementations, the one or more quizzes, surveys, and/or forms may be presented to the user during creation of their user account and/or creator page. In some implementations, one or more classes may be determined based on other input by the new content creators, such as text describing themselves and/or their benefit items; images, video, and/or other content uploaded by the new content creators; and/or other information.

Information component 108 may be configured to obtain existing creator information for existing content creators of the membership platform and/or other information. The existing creator information may characterize the benefit items offered by the existing content creators. By way of non-limiting illustration, the existing creator information may characterize a second set of benefit items offered by a first existing content creator, a third set of benefit items offered by a second existing content creator, and/or other benefit items offered by one or more other existing content creators. In some implementations, the existing creator information may include text making up individual creator pages (e.g., the page information) of the individual existing content creators, image classification information for images and/or other content present on creator pages, and/or other information.

Classification component 110 may be configured to classify individual existing content creators into one or more classes based on the existing creator information and/or other information. The one or more classes may include one or more of a modality class, a genre class, and/or other classes. By way of non-limiting illustration, the first existing content creator may be classified into one or more of a first modality class, a first genre class, and/or other classes. The second existing content creator may be classified into one or more of a second modality class, a second genre class, and/or other classes.

Classification component 110 may be configured to classify individual new content creators into one or more classes based on the new creator information and/or other information. By way of non-limiting illustration, the first new content creator may be classified into one or more of first modality class, the first genre class, and/or other classes.

In some implementations, classifying the individual content creators into a modality class may include generating predictions of the modality class based on the text making up the individual creator pages of the individual existing content creators (e.g., or text input by a new content creator during onboarding). In some implementations, generating the predictions may be performed by one or more of a specifically trained neural network, one or more machine learning processes/algorithms, natural language processing techniques, and/or other methods. By way of non-limiting illustration, a machine learning model may be trained based on input/output data pairs. The input data may include sample text describing a benefit item and/or other information. The output data may include a given class. The model may be updated/refined as the system 100 continues to use the model. In some implementations, a user (e.g., system administrator) may provide input to verify, correct, and/or update the model.

In some implementations, classifying the individual content creators into a modality class may include obtaining image classification information defining image classes of images included in the individual creator pages of the individual existing content creators (or images uploaded by new creators during onboarding). Classifying the individual content creators into a modality class may include updating the predictions of the modality class based on the image classification information to generate classifications into a modality class. Updating the predictions may produce the classifications used to generate one or more creator page recommendations.

In some implementations, the image classification information may allow the predictions made using the text to be verified (e.g., confirmed) and/or corrected. For example, if a class determined from the features extracted from one or more images on a creator page match with the class predicted from the text making up the creator page, then the predicted class may be verified. In some implementations, updating the predictions may be performed using one or more of a specifically trained neural network, one or more machine learning processes/algorithms, a distance matrix, and/or other methods. By way of non-limiting illustration, the predictions based on the text, and the features included in the image classification information, may be input into a distance matrix. The output of the distance matrix may include distances between predictions and features. If the distance between a prediction and a feature falls below at threshold, the predictions may be "verified" and provided as usable classifications. If the distance is greater than a threshold, the predictions may be updated, revised, and/or thrown out.

Recommendation component 112 may be configured to generate relationship information establishing relationships between one or more new content creators and individual existing content creators based on commonality within one or more classes. In some implementations, the relationship information may establish relationships between one or more new content creators and individual existing content creators based on commonality in both a modality class and a genre class. By way of non-limiting illustration, the relationship information may establish a first relationship between the first new content creator and the first existing content creator based on the commonality within the first modality class and the first genre class.

In some implementations, recommendation component 112 may be configured to identify a set of related ones of the existing content creators based on the relationship information and/or other information. The set of related content creators may offer benefit items "related" by one or more of modality class, genre class, and/or other classes. For the set of related ones of the existing content creators, recommendation component 112 may be configured to identify commonalities in the content and/or form of the creator pages of the existing content creators within the set. In some implementations, recommendation component 112 may be configured to include the commonalities in individual creator page recommendations. In some implementations, the set of related content creators may be ranked according to performance information and/or other information. The performance information may include on one or more of subscriber retention (e.g., churn), number of subscribers, monthly consideration earned, and/or other information. Content creators who ranked higher according to the performance information may be consider more "successful" than content creators who ranked lower. In some implementations, recommendation component 112 may be configured to identify commonalities in the content and/or form of the creator pages of the existing content creators that are relatively higher ranked.

Recommendation component 112 may be configured to generate one or more creator page recommendations based on one or more of the relationship information, the ranking, the commonalities, and/or other information. An individual creator page recommendation may include a recommendation as to content and/or form of an individual creator page of an individual new content creator based on the content and/or form of one or more creator pages of one or more existing content creator that are related. By way of non-limiting illustration, a first creator page recommendation may be generated a first creator page recommendation including a recommendation as to the content and/or form of a first creator page for the first new content creator based on the content and/or form of a second creator page for the first existing content creator.

In some implementations, content of the individual creator page may include the subject matter, meaning, substance, and/or information. Form of the individual creator page may include styling, formatting, arrangement, and/or organization of creator page elements. Creator page elements may be features included in a creator page. Creator page elements may include one or more content creator descriptions; cost descriptions (i.e., costs associated with different levels of access); amount, quality, and/or content of images; amount, quality, and/or content of videos; amount, quality, and/or content of graphics; amount, quality, and/or content of communications with subscribers and/or potential subscribers; and/or other features included the individual creator page. For example, a creator page recommendation may include the different subscription levels that should be offered, the price of the different subscriptions levels, the location and/or quantity of images of benefit items being offered, the timing and/or content of communications with potential subscribers, and/or other recommendations.

In some implementation, creator page recommendations may be generated based on the new content creators having a high number of commonalities (e.g., in modality class, genre classes, and/or other classes) with the existing content creators. In some implementations, creator page recommendations may be generated based on the existing content creators being ranked higher according to the performance information. In some implementations, a creator page recommendation may be generated based on the creator page of a single existing content creator. The single existing content creator may be ranked high according to the performance information compared to other content creators. In some implementations, a creator page recommendation may be generated based on commonalities between creator pages of more than one relatively higher ranked existing content creators.

Presentation component 114 may be configured to effectuate presentation of the one or more creator page recommendations and/or other information on one or more computing platforms of one or more of the new content creators. In some implementations, individual computing platforms of individual new content creators may be configured to effectuate presentation of a user interface of the membership platform. In some implementations, individual creator page recommendations may be presented within the user interface. In some implementations, the user interface may be provided as part of an onboarding process where the new content creators set up user accounts and/or start go generate their creator pages. By way of non-limiting illustration, the first creator page recommendation is presented on a first computing platform of the first new content creator.

Presentation component 114 may be configured to implement the one or more creator page recommendations to create the creator pages for the new content creators. In some implementations, implementing the creator pages based on the one or more creator page recommendations may include configuring one or more elements of the creator pages based on the recommendations. The new content creators may be able to further modify and/or define portions of the creator pages created from the one or more recommendations. The new content creators may be able to selectively implement, through user entry and/or selection information the user interface, one or more of the recommended elements from the one or more recommendations.

In some implementations, creator page recommendations may be presented outside of the membership platform. In some implementations, presentation component 114 may be configured to send out creator page recommendations outside of the membership platform using a messaging service. In some implementations, a messaging service may include one or more of SMS text message, email, social media platform, and/or other communication channels.

In FIG. 2, in some implementations, server(s) 102, client computing platform(s) 104, and/or external resource(s) 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resource(s) 116 may be operatively linked via some other communication media.

A given client computing platform may include one or more processors configured to execute one or more computer program components. The computer program components may be configured to enable an expert or user associated with the given client computing platform to interface with system 100, system 10, and/or external resource(s) 116, and/or provide other functionality attributed herein to client computing platform(s) 104. By way of non-limiting example, a client computing platform may include one or more of a desktop computer, a laptop computer, a handheld computer, a tablet computing platform, a NetBook, a Smartphone, a gaming console, and/or other computing platforms.

External resource(s) 116 may include sources of information outside of system 100, external entities participating with system 100, and/or other resources. In some implementations, some or all of the functionality attributed herein to external resource(s) 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 2 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 2 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 3:
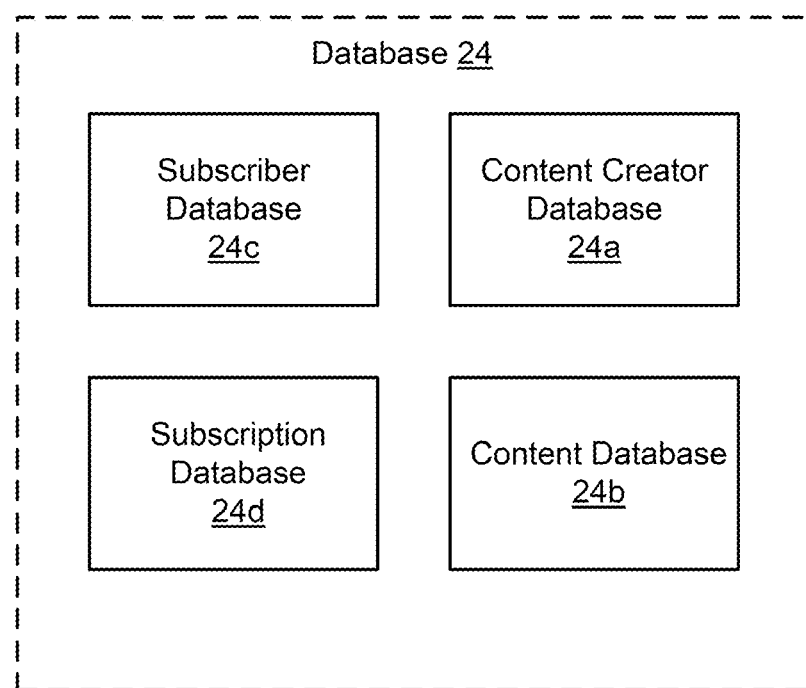
FIG. 3 illustrates an example database.

FIG. 3 illustrates elements that may make up database 24 of FIG. 1. As indicated previously, subscription component 18 of FIG. 1 may transmit information input by content creator 12 and/or consumer 14 regarding content information, subscribership information, and/or other information to database 24. Subscription platform 16, via server 22, for example, may monitor and obtain creation and/or subscribership information for storage in database 24. For example, subscription platform 16 may monitor and store additional information as well as performance-related subscribership information, e.g., engagement activity between content creator 12 and his/her subscribers, one of whom may be consumer 14. For example, subscription platform 16 of FIG. 1 may monitor the amount of money being generated and/or lost through the subscribers (e.g., outcome information), as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, in FIG. 3, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of creator information, subscriber information, and/or other information.

Creator profile information and/or other creator information characterizing content creator may be stored in content creator database 24a. The creator profile information may be information reflecting self-identified preferences regarding the content creator. For example, a profile may reflect that content creator may be a paint artist, a digital artist, a sculptor, a video game developer, a writer, a performance artist, etc. Content creator preferences may reflect subscription levels the content creator wishes to offer to subscribers. Content creator preferences may reflect, e.g., a desired minimum revenue, preferred sources of revenue, subscription level proportions, etc. For example, the content creator preferences may include information indicating content creator's desire for more subscribers pledging some amount of money or less subscribers pledging a greater amount of money. For example, content creator preferences may include information specifying that content creator wishes to supplement his/her subscription-generated revenue with revenue generated from the sale of promotional merchandise.

In addition to content creation-related information, and upon registering with subscription platform as a content creator, content creator may input information characterizing the identity of the content creator. For example, the content creator may input or upload contact information, a telephone number associated with a personal user device, such as smartphone, an email address, a photograph, and/or other identifying information. Such identifying information may be used by subscription platform in a variety of ways to associate the content creator with particular content, his/her webpage, payment of subscription donations, and/or other information.

Consumers may subscribe to content creators by registering with subscription platform. During registration, consumers may input certain subscriber demographic information indicative of economic and/or social characteristics. Subscriber demographic information may reflect the yearly income of consumers, a geographic area in which consumer resides, the age of consumer, interests of consumer, etc. Subscriber information may include data regarding the amount of money consumer is currently pledged to donate to one or more content creators, and/or other information. Over time, as monitored and collected by subscription platform, subscriber information may include information regarding the amount of money consumer has previously donated to one or more content creators and/or other information. Subscriber information, as monitored and obtained by the subscription platform may include an Internet Protocol (IP) address indicative of a current location of a consumer and/or an IP address indicating a payment source. Such information may be stored in subscriber database 24c.

Like content creators, consumers may input or upload other identifying information. For example, a photograph or phone number of a consumer may be used. Such information may be stored in subscriber database 24c.

Subscription level information may refer to information characterizing different subscription levels and corresponding preferential access information specified by content creators. For example, subscription level information may reflect that a ten-dollar recurring donation is rewarded with a high-resolution digital image of artwork created during that month to consumers. Such subscriber level information may be stored in subscription database 24d. Subscribership information may be stored in subscription database 24d and/or other storage location.

It should be noted that other databases or partitions may make up database 24. For example, database 24 may include one or more databases or partitions for storing information including, but not limited to the following: preferential access information characterizing activity in which content creator engagements may refer to data reflecting the type of activity, the level and/or exclusivity of preferential access to that activity granted to consumer; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 5:
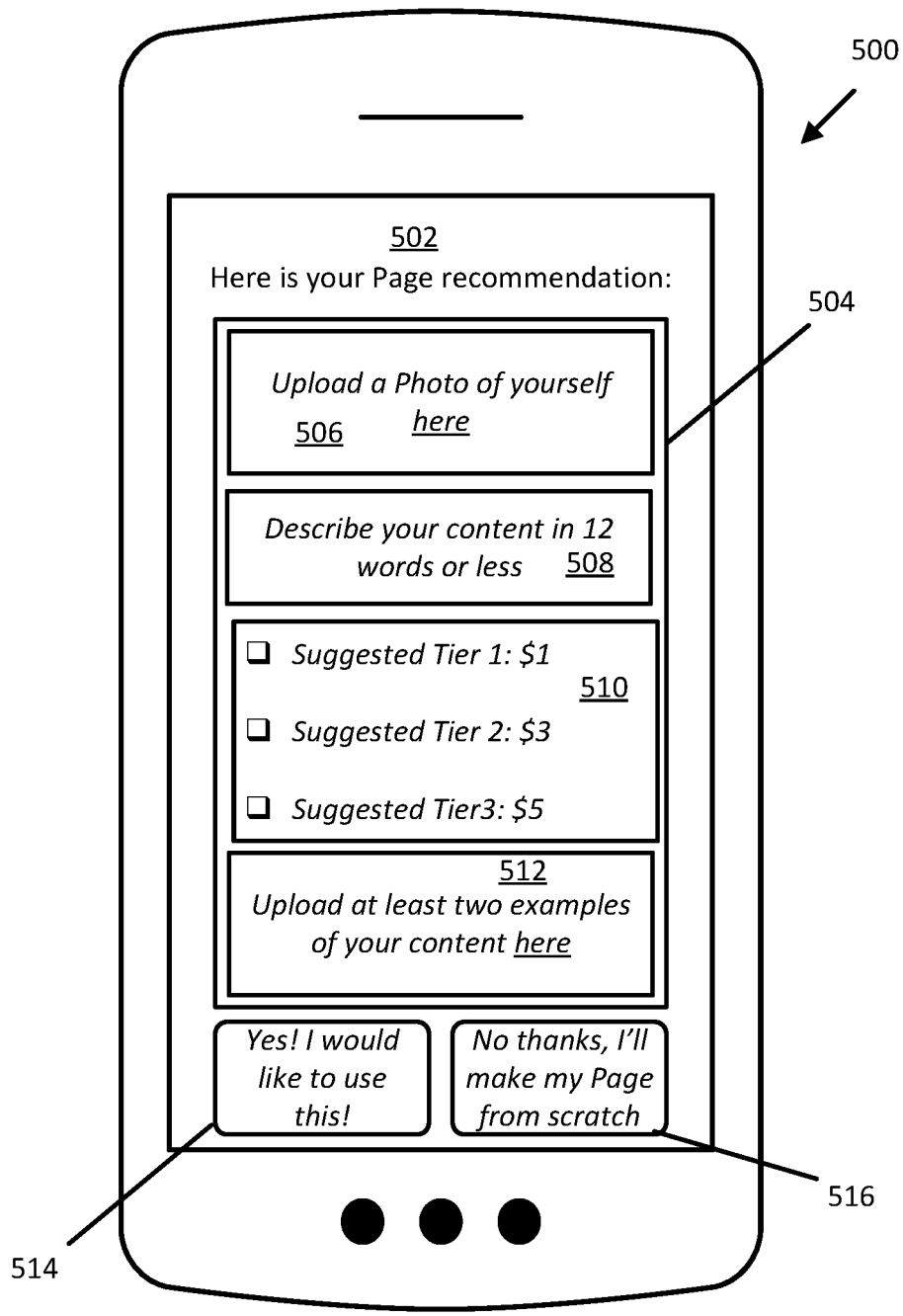
FIG. 5 illustrates a user interface showing a creator page recommendation, in accordance with one or more implementations.

FIG. 5 illustrates a user interface 502 showing a creator page recommendation 504, in accordance with one or more implementations. The user interface 502 may be presented on a computing platform 500 of a new content creator. The creator page recommendation 504 may include recommendation(s) as to the form and/or content of one or more creator page elements. The one or more creator page element may include one or more of a first element 506, a second element 508, a third element 510, a fourth element 512, and/or other elements. The first element 506 may be a recommendation to upload a personal photo. The first element 506 may have a recommended arrangement, e.g., at the top of the page. The second element 508 may be a recommendation to describe content in short-form. The second element 508 may have a recommended arrangement, e.g., below the first element 506. The third element 510 may be a recommendation of suggested subscription levels and/or the prices to offer at the subscription levels. The third element 510 may have a recommended arrangement, e.g., below the second element 508. The fourth element 512 may be a recommendation for showing exemplary photos of content to be offered. fourth element 512 may have a recommended arrangement, e.g., below the third element 510. The user interface 502 may include a user interface element 514 configured to be selected by a user to implement the creator page recommendation 504 and/or one or more elements thereof. The user interface 502 may include a user interface element 516 configured to be selected by a user to deny the creator page recommendation 504. In that case the user may create their page from scratch and/or by other processes.

Figure 4:
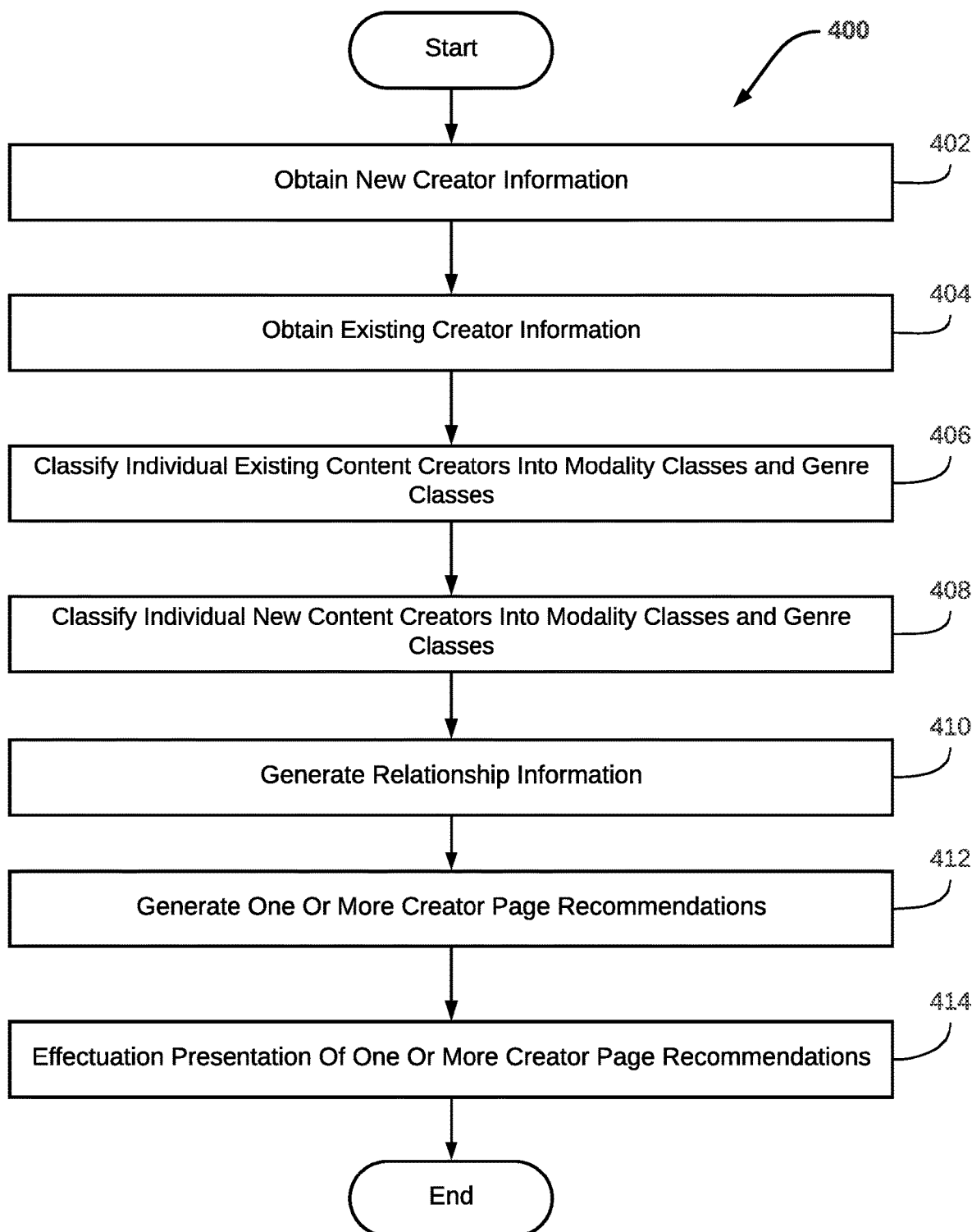
FIG. 4 illustrates a method to generate creator page recommendations for content creators within a membership platform, in accordance with one or more implementations.

FIG. 4 illustrates a method 400 to generate creator page recommendations for content creators within a membership platform based on classification of content creators, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a physical processor, digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining new creator information for new content creators of a membership platform and/or other information. The new content creators may offer benefit items to subscribers of the membership platform who subscribe to the content creators in exchange for consideration. The new creator information may characterize the benefit items to be offered by the new content creators. By way of non-limiting illustration, the new creator information may characterize a first set of benefit items to be offered by a first new content creator. Operation 402 may be performed by one or more hardware processors configured by machine-readable instructions including a component that is the same as or similar to information component 108.

An operation 404 may include obtaining existing creator information for existing content creators of the membership platform and/or other information. The existing creator information may characterize the benefit items offered by the existing content creators. By way of non-limiting illustration, the existing creator information may characterize a second set of benefit items offered by a first existing content creator, and a third set of benefit items offered by a second existing content creator. Operation 404 may be performed by one or more hardware processors configured by machine-readable instructions including a component that is the same as or similar to information component 108.

An operation 406 may include classifying individual existing content creators into modality classes, genre classes, and/or other classes based on the existing creator information and/or other information. An individual modality class may characterize a mode in which the benefit items offered by the individual existing content creators are experienced or are expressed. An individual genre class may characterize a theme or topic of the benefit items offered by the individual existing content creators. By way of non-limiting illustration, the first existing content creator may be classified into a first modality class and a first genre class, and the second existing content creator may be classified into a second modality class and a second genre class. Operation 406 may be performed by one or more hardware processors configured by machine-readable instructions including a component that is the same as or similar to classification component 110.

An operation 408 may include classifying individual new content creators in the modality classes, genre classes, and/or other classes based on the new creator information and/or other information. By way of non-limiting illustration, the first new content creator may be classified into one or more of the first modality class, the first genre class, and/or other classes. Operation 408 may be performed by one or more hardware processors configured by machine-readable instructions including a component that is the same as or similar to classification component 110.

An operation 410 may include generating relationship information establishing relationships between the new content creators and the existing content creators based on commonality within one or more of the modality classes, the genre classes, and/or other classes. By way of non-limiting illustration, the relationship information may establish a first relationship between the first new content creator and the first existing content creator based on the commonality within the first modality class, the first genre class, and/or other classes. Operation 410 may be performed by one or more hardware processors configured by machine-readable instructions including a component that is the same as or similar to recommendation component 112.

An operation 412 may include generating one or more creator page recommendations based on the relationship information and/or other information. An individual creator page recommendation may include a recommendation as to content and/or form of an individual creator page of an individual new content creator based on the content and/or form of one or more creator pages of one or more of the existing content creator that are related. By way of non-limiting illustration, a first creator page recommendation may be generated based on the relationship information. The first creator page recommendation may include a recommendation as to the content and/or form of a first creator page for the first new content creator based on the content and/or form of a second creator page for the first existing content creator. Operation 412 may be performed by one or more hardware processors configured by machine-readable instructions including a component that is the same as or similar to recommendation component 112.

An operation 414 may include effectuating presentation of the one or more creator page recommendations on one or more computing platforms of one or more of the new content creators. By way of non-limiting illustration, the first creator page recommendation may be presented on a first computing platform of the first new content creator. Operation 414 may be performed by one or more hardware processors configured by machine-readable instructions including a component that is the same as or similar to presentation component 114.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate creator page recommendations for content creators within a membership platform, the system comprising:
one or more physical processors configured by machine-readable instructions to:
obtain new creator information for new content creators of a membership platform, the new content creators offering subscribership in exchange for consideration, the new creator information characterizing benefit items to be received by subscribers of the new content creators in accordance with the subscribership to be offered by the new content creators, such that the new creator information characterizes a first set of benefit items to be received by the subscribers of a first new content creator in accordance with a first subscribership offered by the first new content creator;
obtain existing creator information for existing content creators of the membership platform, the existing creator information characterizing benefit items received by subscribers of the existing content creators in accordance with subscribership offered by the existing content creators, such that the existing creator information characterizes a second set of benefit items received by the subscribers of a first existing content creator, and a third set of benefit items received by the subscribers of a second existing content creator;
classify the existing content creators into modality classes and genre classes based on the existing creator information, an individual modality class characterizing how the subscribers consume the benefit items, an individual genre class characterizing a theme or topic of the benefit items, such that the first existing content creator is classified into a first modality class and a first genre class, and the second existing content creator is classified into a second modality class and a second genre class, wherein classifying the existing content creators into the modality classes includes:
training a machine learning model to generate a trained machine learning model, the trained machine learning model being configured to output predictions of the modality classes of the existing content creators, wherein the machine learning model is trained based on training input/output data pairs, wherein training input data of an individual input/output data pair includes the existing creator information of an individual existing content creator, and training output data of the individual input/output data pair includes the individual modality class of the individual existing content creator;
providing the existing creator information for one or more of the existing content creators as input into the trained machine learning model;
obtaining the output from the trained machine learning model generated based on the input of the existing creator information for the one or more of the existing content creators; and
determining the modality classes of the one or more of the existing content creators from the output of the trained machine learning model;
classify the new content creators into the modality classes and the genre classes based on the new creator information, such that the first new content creator is classified into the first modality class and the first genre class;
generate relationship information establishing relationships between the new content creators and the existing content creators based on commonality within the modality classes and the genre classes, such that the relationship information establishes a first relationship between the first new content creator and the first existing content creator based on the commonality within the first modality class and the first genre class;
generate one or more creator page recommendations based on the relationship information, an individual creator page recommendation including a recommendation as to content and/or form of an individual creator page of an individual new content creator based on the content and/or form of one or more creator pages of one or more of the existing content creators that are related, such that a first creator page recommendation is generated based on the relationship information, the first creator page recommendation including a recommendation as to the content and/or form of a first creator page for the first new content creator based on the content and/or form of a second creator page for the first existing content creator; and
effectuate presentation of the one or more creator page recommendations on one or more computing platforms of one or more of the new content creators, such that the first creator page recommendation is presented on a first computing platform of the first new content creator.

2. The system of claim 1, wherein how the subscribers consume the benefit items is characterized by interactions with the benefit items and physiological reactions to the benefit items.

3. The system of claim 1, wherein the existing creator information includes text making up individual creator pages of individual existing content creators, and wherein classifying the existing content creators into the modality classes further includes:
obtaining image classification information defining image classes of images included in the individual creator pages of the individual existing content creators; and
updating the predictions of the modality classes based on the image classification information.

4. The system of claim 1, wherein the theme or the topic is characterized based on form, style, or subject matter of the benefit items.

5. The system of claim 1, wherein the individual modality class further characterizes how the existing content creators produce the benefit items.

6. The system of claim 5, wherein how the existing content creators produce the benefit items is characterized by steps and/or actions taken to produce the benefit items.

7. The system of claim 1, wherein the modality classes include one or more of an ASMR class, a game modification class, a music performance class, a photography class, a podcast class, a video class, a visual arts class, or a writing class.

8. The system of claim 1, wherein the new creator information includes specification of the modality classes and the genre classes based on user input by the new content creators.

9. The system of claim 1, wherein the one or more physical processors are further configured by the machine-readable instructions to:
- identify a set of related ones of the existing content creators based on the relationship information; and
- for the set of related ones of the existing content creators, identify commonalities in the content and/or form of the creator pages of the existing content creators within the set; and
- include the commonalities in individual creator page recommendations.

10. A method to generate creator page recommendations for content creators within a membership platform, the method comprising:
- obtaining new creator information for new content creators of a membership platform, the new content creators offering subscribership in exchange for consideration, the new creator information characterizing benefit items to be received by subscribers of the new content creators in accordance with the subscribership to be offered by the new content creators, including obtaining the new creator information characterizing a first set of benefit items to be received by the subscribers of a first new content creator in accordance with a first subscribership offered by the first new content creator;
- obtaining existing creator information for existing content creators of the membership platform, the existing creator information characterizing benefit items received by subscribers of the existing content creators in accordance with subscribership offered by the existing content creators, including obtaining the existing creator information characterizing a second set of benefit items received by the subscribers of a first existing content creator, and a third set of benefit items received by the subscribers of a second existing content creator;
- classifying the existing content creators into modality classes and genre classes based on the existing creator information, an individual modality class characterizing how the subscribers consume the benefit items, an individual genre class characterizing a theme or topic of the benefit items, including classifying the first existing content creator into a first modality class and a first genre class, and the second existing content creator into a second modality class and a second genre class, wherein the classifying the existing content creators into the modality classes includes:
  - training a machine learning model to generate a trained machine learning model, the trained machine learning model being configured to output predictions of the modality classes of the existing content creators, wherein the machine learning model is trained based on training input/output data pairs, wherein training input data of an individual input/output data pair includes the existing creator information of an individual existing content creator, and training output data of the individual input/output data pair includes the individual modality class of the individual existing content creator;
  - providing the existing creator information for one or more of the existing content creators as input into the trained machine learning model;
  - obtaining the output from the trained machine learning model generated based on the input of the existing creator information for the one or more of the existing content creator; and
  - determining the modality classes of the one or more of the existing content creators from the output of the trained machine learning model;
- classifying the new content creators into the modality classes and the genre classes based on the new creator information, including classifying the first new content creator into the first modality class and the first genre class;
- generating relationship information establishing relationships between the new content creators and the existing content creators based on commonality within the modality classes and the genre classes, including establishing a first relationship between the first new content creator and the first existing content creator based on the commonality within the first modality class and the first genre class;
- generating one or more creator page recommendations based on the relationship information, an individual creator page recommendation including a recommendation as to content and/or form of an individual creator page of an individual new content creator based on the content and/or form of one or more creator pages of one or more of the existing content creators that are related, including generating a first creator page recommendation based on the relationship information, the first creator page recommendation including a recommendation as to the content and/or form of a first creator page for the first new content creator based on the content and/or form of a second creator page for the first existing content creator; and
- effectuating presentation of the one or more creator page recommendations on one or more computing platforms of one or more of the new content creators, including presenting the first creator page recommendation on a first computing platform of the first new content creator.

11. The method of claim 10, wherein how the subscribers consume the benefit items is characterized by interactions with the benefit items and physiological reactions to the benefit items.

12. The method of claim 10, wherein the existing creator information includes text making up individual creator pages of individual existing content creators, and wherein classifying the existing content creators into the modality classes further includes:
- obtaining image classification information defining image classes of images included in the individual creator pages of the individual existing content creators; and
- updating the predictions of the modality classes based on the image classification information.

13. The method of claim 10, wherein the theme or the topic is characterized based on form, style, or subject matter of the benefit items.

14. The method of claim 10, wherein the individual modality class further characterizes how existing content creators produce the benefit items.

15. The method of claim 14, wherein how the existing content creators produce the benefit items is characterized by steps and/or actions taken to produce the benefit items.

16. The method of claim 10, wherein the modality classes include one or more of an ASMR class, a game modification class, a music performance class, a photography class, a podcast class, a video class, a visual arts class, or a writing class.

17. The method of claim 10, wherein the new creator information includes specification of the modality classes and the genre classes based on user input by the new content creators.

18. The method of claim 10, further comprising:
identifying a set of related ones of the existing content creators based on the relationship information; and
for the set of related ones of the existing content creators, identifying commonalities in the content and/or form of the creator pages of the existing content creators within the set; and
including the commonalities in individual creator page recommendations.

* * * * *